(12) United States Patent
Kelly

(10) Patent No.: US 7,748,683 B1
(45) Date of Patent: Jul. 6, 2010

(54) ELECTRICALLY CONTROLLED PROPORTIONAL VALVE

(76) Inventor: Edmund F. Kelly, 711 W. 17th St., Suite F8, Costa Mesa, CA (US) 92627

( * ) Notice: Subject to any disclaimer, the term of this patent is extended or adjusted under 35 U.S.C. 154(b) by 758 days.

(21) Appl. No.: 11/709,792

(22) Filed: Feb. 23, 2007

(51) Int. Cl.
*F16K 31/02* (2006.01)

(52) U.S. Cl. ............................ 251/129.08; 251/129.16; 251/337

(58) Field of Classification Search ............ 251/129.15, 251/128.08, 129.16, 337
See application file for complete search history.

(56) References Cited

U.S. PATENT DOCUMENTS

| | | | |
|---|---|---|---|
| 3,766,935 A | 10/1973 | Clippard, III | |
| 3,786,831 A | 1/1974 | Clippard, III | |
| 3,827,672 A | 8/1974 | Stampli | |
| 3,921,670 A | 11/1975 | Clippard Jr. et al. | |
| 4,196,751 A * | 4/1980 | Fischer et al. | 137/625.65 |
| 4,245,815 A | 1/1981 | Willis | |
| 4,635,683 A | 1/1987 | Nielsen | |
| 4,664,136 A | 5/1987 | Everett | |
| 4,954,799 A | 9/1990 | Kumar | |
| 4,969,629 A * | 11/1990 | Athanassiu | 251/331 |
| 5,158,263 A * | 10/1992 | Shimizu et al. | 251/129.21 |
| 5,211,372 A * | 5/1993 | Smith, Jr. | 251/75 |
| 5,232,196 A | 8/1993 | Hutchings et al. | |
| 5,265,842 A * | 11/1993 | Sorah et al. | 251/129.08 |
| 5,374,029 A * | 12/1994 | Bailey | 251/129.16 |
| 5,424,704 A | 6/1995 | Dolle | |
| 5,544,674 A | 8/1996 | Kelly | |
| 6,067,946 A * | 5/2000 | Bunker et al. | 251/63.6 |
| 6,079,435 A * | 6/2000 | Franz et al. | 251/129.08 |
| 6,220,569 B1 | 4/2001 | Kelly | |
| 6,263,904 B1 * | 7/2001 | Zdunek et al. | 137/375 |
| 6,299,130 B1 * | 10/2001 | Yew et al. | 251/129.15 |
| 6,722,627 B2 * | 4/2004 | Murao et al. | 251/129.15 |
| 6,983,924 B2 * | 1/2006 | Howell et al. | 251/118 |
| 7,126,449 B2 * | 10/2006 | Nickel et al. | 251/129.15 |

FOREIGN PATENT DOCUMENTS

DE  2303450  8/1974

* cited by examiner

*Primary Examiner*—John Bastianelli
(74) *Attorney, Agent, or Firm*—John D. Gugliotta, PE, Esq.

(57) ABSTRACT

An electrically controlled proportional valve provides for precise control of armature movement using an armature which is positioned at the center of the valve by centering leaf springs. The armature is supported and biased axially by angled leaf springs that support the armature in an orbital fashion. These angled orbital leaf springs support the armature for elastic movement in the axial direction, and hold it biased against a first port, so that the armature functions as a valve element, which normally closes that port. A magnet coil is positioned so that when an electrical current passes through the coil, it exerts a force on the armature which overcomes the bias of the orbital leaf springs and draws the armature away from the first port and toward the magnet coil.

18 Claims, 4 Drawing Sheets

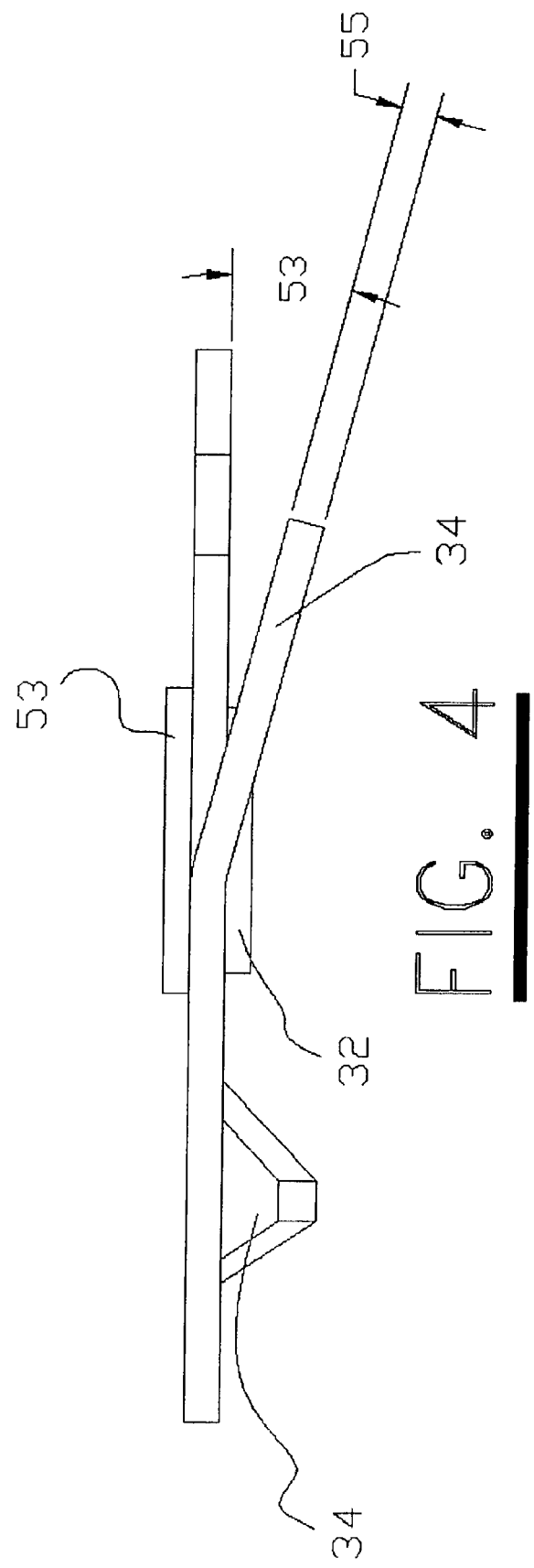

ELECTRICALLY CONTROLLED PROPORTIONAL VALVE

BACKGROUND OF THE INVENTION

1. Field of the Invention

The present invention relates to a proportional valve and, more particularly, to an electrically controlled proportional valve having a movable valve element which is in the form of an orbital leaf spring valve element, and which also comprises the armature operated by the electromagnet coil.

2. Description of the Related Art

Proportional valves are useful in pneumatic control circuits, and may be used, for example, to control precise gas flow through the valve. A search of the prior art did not disclose any patents that read directly on the claims of the instant invention; however, of considerable relevance is U.S. Pat. No. 6,220,569 to Kelly which shows an electrically operated pneumatic valve in which a combination magnetically operated armature and an angled surface of the valve case are biased so as to proportionally control flow. However, in such a configuration the total travel distance of the moment arm, and therefore the resultant flow resolution and armature stability, is limited by the total radial distance of the armature, as opposed to the proposed orbital leaf spring design.

This limitation is overcome by the present invention. The proposed orbital leaf spring increases the available travel distance of the moment arm by a minimum of three fold, due to its orbital positioning and structure, thereby increasing performance resolution and armature stability.

Consequently, a need has been felt for providing an electrically operated pneumatic valve utilizing an orbital leaf spring.

SUMMARY OF THE INVENTION

It is an option of the present invention to provide an improved electrically controlled proportional valve.

It is a feature of the present invention to provide an electrically operated proportional valve having a movable valve element which is in the form of an orbital leaf spring valve element.

It is a further feature of the present invention to provide an electrically operated proportional valve which also comprises the armature operated by the electromagnet coil. Such a valve element includes orbital leaf springs which bias the armature-valve element against a port, so that the armature normally closes the port.

An advantage of the use of an orbital leaf spring valve element is the substantial reduction of the armature weight.

It is the objective of this invention to provide a magnetically operated type valve wherein the application of a very small amount of electric power to the magnet coil will create a proportional relationship between the electrical current of the magnet coil to a precise control of valve flow.

Briefly described according to one embodiment of the present invention, a valve in accordance with the invention includes a body structure presenting a first port entering an internal cavity or chamber. Also, communicating with said cavity is a second port. Flow through the first port is controlled by a movable armature-valve element which is a magnetically responsive assembly in the form of a armature-valve element. More specifically, the armature is at the center of the armature-valve element, and centering leaf springs make the armature concentric to the magnet coil. The valve element's orbital leaf springs are configured in such a way as to have the outer ends of the leafs biased or pressed against the valve case, causing the armature to rest against the first port valve seat, so that that port is normally closed. The valve element thus provides support for the armature that obviates the sliding friction or "scrubbing" that accompanies solenoid-type armatures. In the embodiment, during electrical activation of the valve, the armature is used to control flow between the first port and second port that both communicate with the cavity.

The incorporation of the orbital leaf spring design, as opposed to a radial spring design, offers a larger range of performance, as well as improved resolution. This is due to the circular structure of the orbital leaf springs, such that the total available travel distance of the moment force is not limited to a radial distance from the center of the armature. As shown in U.S. Pat. No. 6,220,569, a radial spring design defines the path of travel of the moment force linearly, from the center of the armature to the outer diameter of the armature support. Alternately, the orbital leaf spring design defines the path of travel of the moment force circularly, along an orbital path distanced from the axis of rotation, or center of the armature. Due to the circular path made available by the orbital leaf spring design, the total available travel distance of the moment force is equivalent to the total available arc length, and so from trigonometry, the arc length may be greater than the radius, or available radial distance, while the radius is limited linearly. Therefore, due to its circular nature, the orbital leaf spring design inherently offers a larger range of travel for the moment force, more numerous moment force positions, and therefore higher resolution performance.

Another advantage to the incorporation of the orbital leaf spring design, as opposed to a radial spring design, is improved stability of the armature, and therefore improved hysteresis performance. This is due to the orbital travel of the moment force about the axis of rotation, or center of the armature. As mentioned previously, a radial spring design defines the path of travel of the moment force linearly; in use, the moment arm, or distance of the moment force from the center of the armature, moves linearly toward the center of the armature as the magnetic pull on the armature increases. An effect of this linear movement is a decrease in the total cantilever distance, and therefore from physics, a resultant decrease in the downward force at this position, thereby lowering the force that the armature is being held against the valve case by the radial springs.

Therefore, the resultant effect of a decrease in cantilever distance is a loss of stability of the armature on the valve case, which can directly increase hysteresis levels, as well as making the armature more susceptible to vibratory or non-static environments. The proposed orbital design differs in that there is no drop in total cantilever distance with an increase in magnetic pull on the armature, as it is a constant orbital distance from the axis, and therefore maintains a consistent torque axially against the valve case, thereby maintaining a more consistent stability of the armature. An effect of the consistent torque offered by the orbital leaf spring design is a more reliable level of stability and resultant hysteresis.

Additionally, the cost of production is lowered due to the simplification of the valve case design; by incorporating all functionality necessary to create the proportional relationship into a single armature, and therefore not being dependant on the valve case design, the need to accurately machine the valve case ramp is removed, and therefore the design is simplified. In comparison to the machining cost of the valve case ramp, the etching of the proposed armature design is much more cost effective.

The above and other objects and advantages of the present invention shall be made apparent from the accompanying drawings and the description thereof.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is an enlarged side view of the armature-valve element of the valve shown in FIGS. 1 and 2.

DESCRIPTION OF THE PREFERRED EMBODIMENTS

The best mode for carrying out the invention is presented in terms of its preferred embodiment, herein depicted within the Figures.

1. Detailed Description of the Figures

Figure 3:
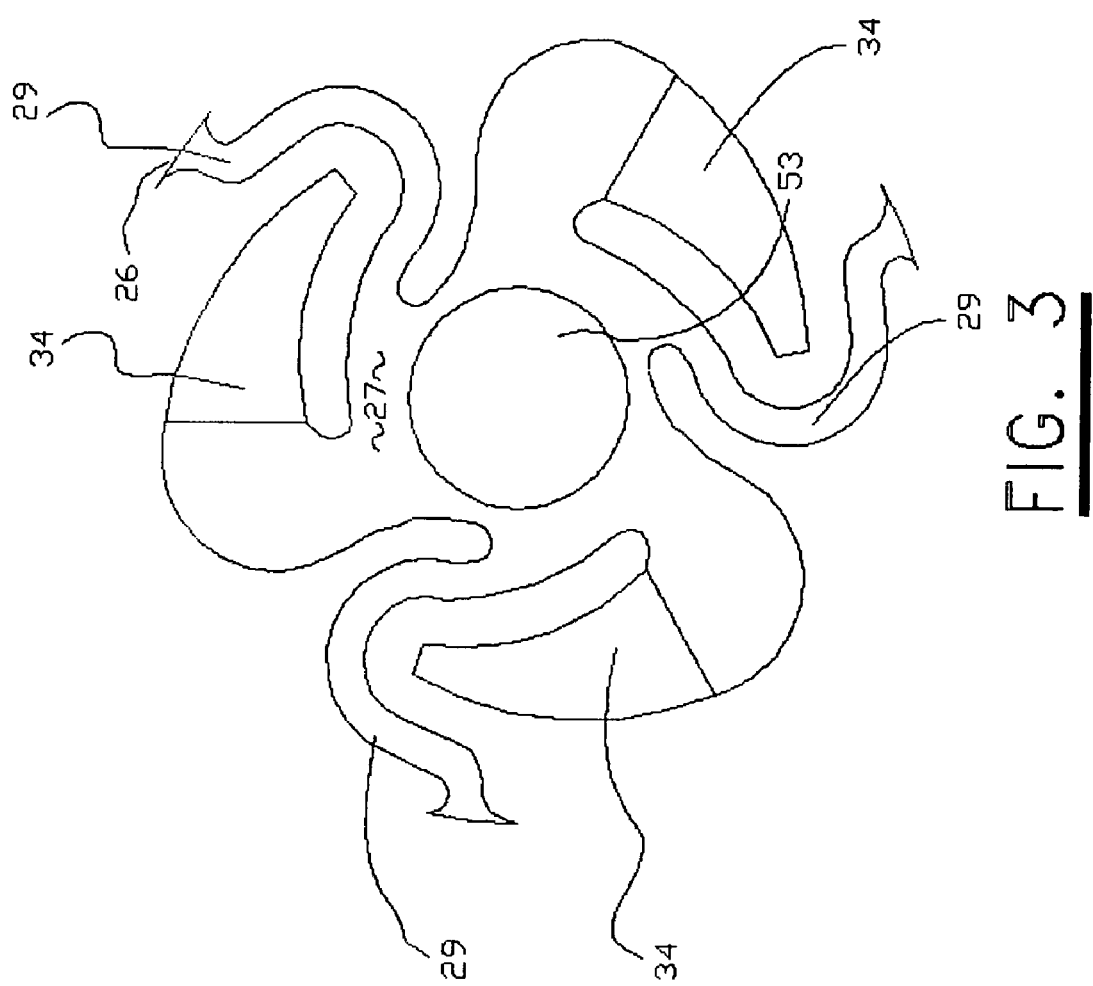
FIG. 3 is an enlarged plan view of the armature-valve element of the valve shown in FIGS. 1 and 2.

The valve embodiment illustrated in the drawing includes body structure 10 which is adapted to be received in one end of the internal cavity of the manifold body of valves of the type shown in U.S. Pat. Nos. 3,766,935, 3,786,831, and 6,220,569. Body 10 has a stopped central bore 11, in which is secured an insert 12 that presents an axial first passage 13 that leads through a stepped bore 14 to a first port 15. A tip 18 of small area is presented by insert 12 around first port 15, and forms a small seat for a movable valve element to be described. A bore 19 leads radially through body 10 to the inner end of bore 11, and in use a fluid conduit, not shown, may be coupled to this bore 19. Body 10 is recessed, as at 20, around the projecting tip 18 of insert 12. An external skirt 22 surrounds recess 20, thereby defining an internal cavity or valve chamber 30. An internal pocket or bore 21 is formed around skirt 22, and this pocket is spaced axially from the recess 20. An element 26, referred to herein as a "armature-valve element", is centered in the pocket 21 by use of centering leaf springs 29. The armature-valve element is yieldable in the axial direction by use of orbital leaf springs 34. In the preferred embodiment, as best shown in FIG. 3, armature-valve element 26 is an assembly which includes a unitary central portion or armature 27 and a means of centering the armature by the use of centering leaf springs 29. These centering leaf springs 29 being connected to the armature 27 in a curvature fashion to reduce stress. Orbital leaf springs 34 are bent to an angle as shown in FIG. 4 to act as springs and are axially deflected against case 40 (not shown in FIG. 3) for added spring force during armature movement.

At its center the armature 27 carries a magnetically responsive disk 53 concentrically attached to armature 27 by use of a mechanical press fit, as shown in FIG. 4. The addition of the magnetically responsive disk 53 combines with armature 27 to increase the mass at the center of the armature-valve element 26. This additional mass at the center of armature-valve element 26 substantially increases the attraction force exerted on it by the energized magnet coil 62. Disk 53 may or may not have attached to it an elastomeric port sealing member 32. The member 32 can be attached to the disk 53 in various manners Both armature-valve element 26 and magnetically responsive material disk 32 combine to form a magnetically responsive but not permanently magnetizable (i.e., ferromagnetic) assembly which is also springlike. Such materials are commercially available.

These orbital leaf springs are at an leaf spring angle 53 that varies from a preferred angle of between 5 to 30 degrees with respect to the armature plane, as shown in FIG. 4. However, it is anticipated that similar results can be achieved with the creation of other angles, and a range of 2 to 60 degrees appears to provide the broadest optimal range of selection. This creates orbital leaf spring forces to support the armature for elastic movement in the axial direction, and hold it biased against a first port, so that the armature functions as a valve element, which normally closes that port.

Figure 1:
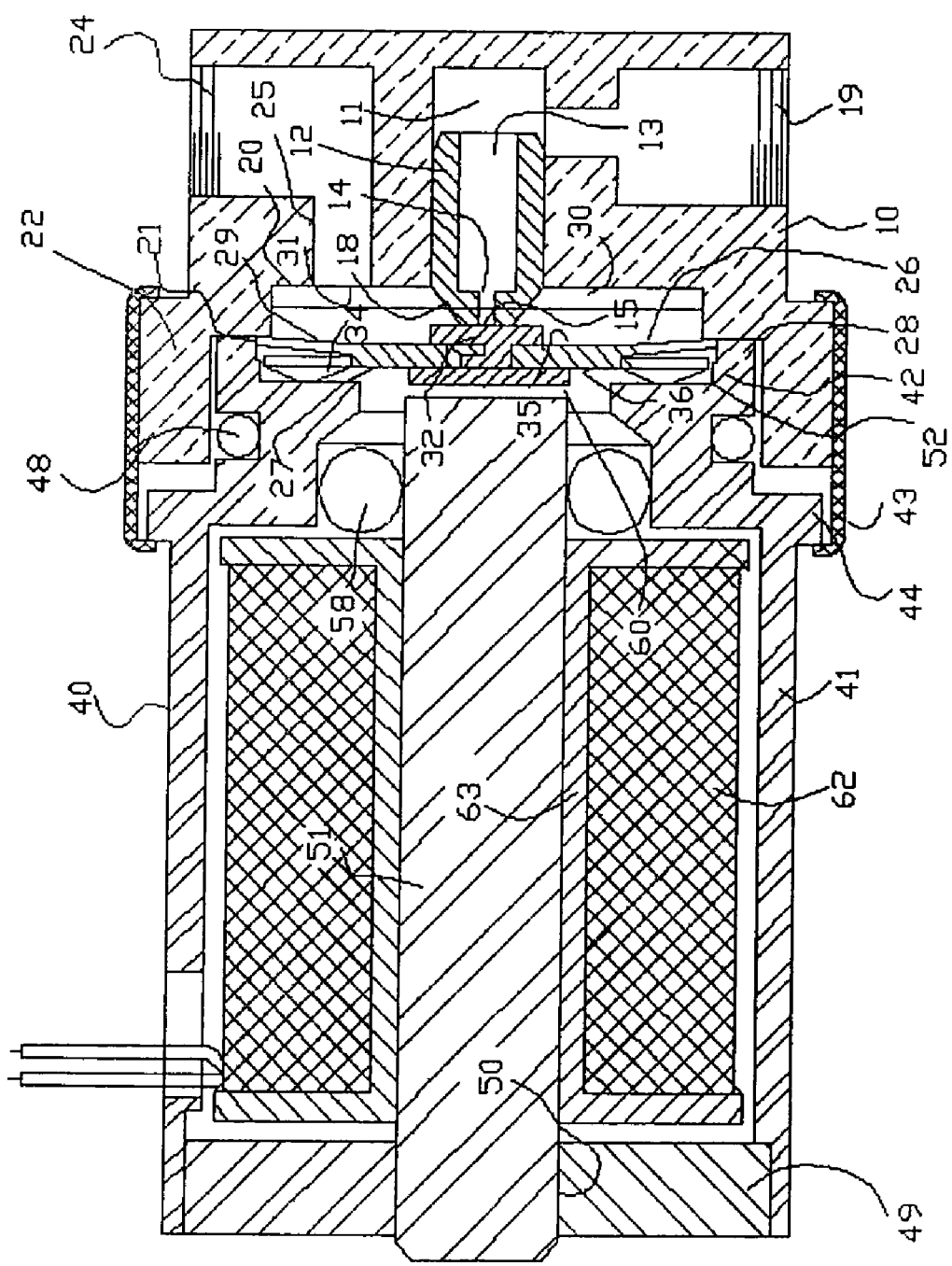
FIG. 1 is an axial section of a preferred form of a valve in accordance with the invention, showing the valve in the normal, magnet de-energized condition.

The armature-valve element 26 contains centering leaf springs 29 that both center the armature 27 and properly position the orbital leaf springs 34, i.e., to the right in FIG. 1, at the position at which the elastomeric member 32 attached to disk 53 comes to bear against port 15. In this position, stress is to the orbital leaf springs 34 of the armature-valve element 26, which urges the center portion or armature, including the elastomeric member therein, to the right and against the first port, so that normally (i.e., when the coil to be described is not energized), the armature closes and seals port 15 and a force of certain magnitude is required to draw the armature away from that port and open that port to chamber 30. Passages 24 and 25 lead through body 10 to a second port 31 which also opens to chamber 30.

The armature-valve element 26 is centered in pocket 21 by a coil carrying case designated generally at 40. Case 40 includes a ferromagnetic or a magnetically responsive outer shell or cylinder 41 which has a centrally extending rim or flange 42 at one end thereof, i.e., the right end in FIG. 1. Radially inward from flange 42 on case 40 is a flat contact leaf spring surface 52 which acts as a rigid support for the orbital leaf springs 34 that are an integral part of the armature-valve element 26. A crimped ring 43 is carried on a retaining rib 44 around shell 41, and this crimped ring 43 is mechanically formed so it snuggly pulls the retaining rib 44 to the body skirt 22, thereby to hold the body to and case together. An O-ring 48 is carried in a peripheral groove around flange 42, and forms a seal with the inside surface of body skirt 22 to prevent loss of fluid pressure in operation.

At its outer or left end in FIG. 1, shell 41 is provided with an end plate 49 which has a bore 50. In this axial bore 50 is secured a central core, also ferromagnetic, designated at 51. An O-ring 58 provides a fluid seal between core 51 and the outer shell.

An electric coil 62, wound on a spool or bobbin 63, is mounted on core 51 within shell 41 between end cap 49 and flange 42. It will be noted that an air gap 60, in the magnetic path of coil 62, is presented between core 51 and the radially inner edge of flange 42.

In one mode of use, a source of pressure air is connected to passage 19 and the first port 15 is thus a pressure port which is normally closed. Passage 24 is connected to an object upon which work is to be done (e.g., a cylinder, or to the spool of a second stage valve), and port 31 thus is a control port.

Figure 2:
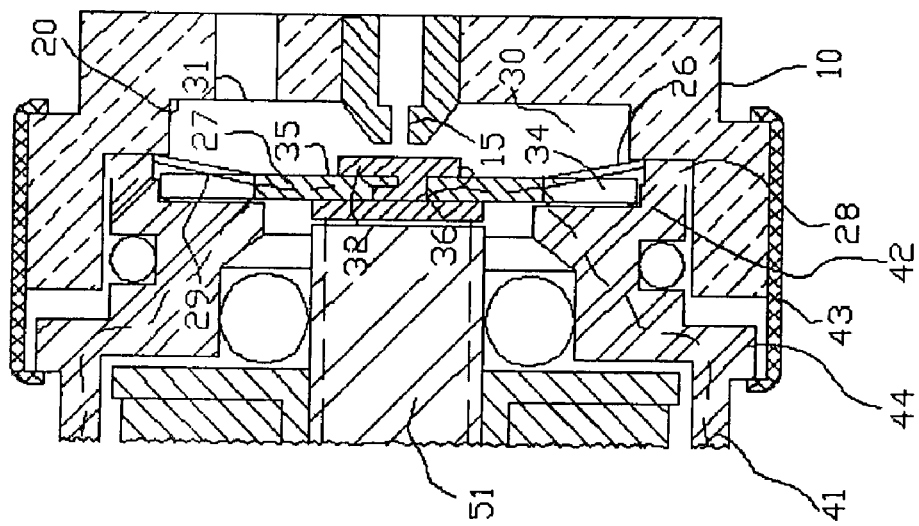
FIG. 2 is a fragmentary view similar to FIG. 1 but showing the valve in the energized condition.

When magnet coil 62 is energized by electrical current passing through it, a magnetic field is set up around it in the circuit including core 51, end plate 49, shell 41, flange 42, across air gap 60 via the armature 27 of armature-valve element 26, and core 51. The magnetic circuit is shown by the dashed lines in FIG. 2; the magnetic circuit extends via flange 42, the center portion of the armature-valve element 26, and the core. Air gap 60 causes magnetic flux density to be elevated in air gap 60, so that the armature 27 in the center portion of the armature-valve element is magnetically drawn toward the core 51, to the left as shown in FIG. 2.

The magnitude of the magnetic force exerted on the armature, in comparison to the opposing spring force exerted by the orbital leaf springs 34, is sufficient to overcome the spring bias, and the armature 27 of the armature-valve element is drawn away from first (or pressure) port 15. As this occurs, fluid communication is established between pressure port 15 and the second (or control) port 31. As the armature 27 is drawn away from the first port 15 the orbital leaf springs 34 are deflected against the flat contact leaf spring surface 52 of the housing, thus causing an opposing spring force to the armature movement. The armature will continue to move until the orbital leaf springs cause an equal and opposite force that opposes the magnetic force exerted on the armature. As electrical current is increased, the additional force created, will once again cause the armature to move toward the magnet coil until the leaf spring force exerted on the flat contact leaf spring surface 52 is again equal to the magnet coil force. The orbital leaf springs 34 are constructed in such a non-uniform beam manner as to create a linear relationship between magnet coil current and axial armature movement. To compensate for manufacturing tolerances of material thickness, the orbital leaf springs 34 can have their leaf spring thickness 55 increased by the use of an electroless nickel plating process. This plating process allows for extreme accurate plating thickness in the order of increments of 0.0001" to be applied to the leaf. This ensures the beams to have a more consistent spring force from beam to beam in production. Since the strength of the beam is proportional to the cube root of the thickness, this process will alleviate large inconsistencies in the repeatability of leaf spring constants. In no way is it the intention of the applicant to limit this plating process to solely electroless nickel plating. Additional plating processes are available that would accomplish the same goal. Additional advantages and modifications would readily appear obvious to those skilled in the art.

The approximate linear relationship between armature movement away from first port 15, and therefore fluid flow through first port 15, to electrical current through said magnet coil creates a means of controlling valve flow in a manner that is approximately linear to electrical current through said magnet coil. While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

2. Operation of the Preferred Embodiment

By way of example, where the invention is embodied in such a pneumatic control valve, the range of armature movement ranges from 0.005 to 0.050 inches, although this will of course vary with and depend upon pressure, bore sizes and the like. Inlet pressures up to about 700 psi can be controlled at a very fractional wattage power consumption, by reason of the low mass, low friction armature and its mounting. The armature-valve element configuration provides very uniform operation in that it holds the shiftable armature center portion precisely perpendicular to the axes of the ports. Thus, a relatively large inlet pressure can be utilized to control port 31, with a very small power input.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. An electrically controlled flow valve comprising:
   a valve body defining a cavity having an interior surface and including first and second ports extending exterior of said valve body;
   an armature within said cavity, the movement of said armature for controlling the flow of fluid through said cavity;
   a leaf spring, said leaf spring supporting said armature within said cavity and providing a biasing force against said armature; wherein said leaf spring comprises centering leaf springs in combination with a plurality of orbitally disposed leaf spring elements radiating arcuately from a valve centering support and adapted such that a contact point of said leaf spring to said armature remains substantially at the same distance from the armature's centerpoint during in and out movement of said armature such that said orbitally disposed leaf spring elements are axially deflected against said interior surface of said valve body;
   a magnet coil in combination with said valve body, said magnet coil for channeling magnetic field for providing an urging force to said armature opposite the biasing three of said leaf spring;
   wherein the leaf spring biasing three is coordinated with the magnetic coil urging force.

2. The electrically controlled flow valve of claim 1, wherein said leaf spring is constructed to provide a non-linear urging bias along the axial armature, movement.

3. The electrically controlled flow valve of claim 1, wherein the coordination of said leaf spring biasing force and said magnetic coil urging force create an approximately linear relationship between magnetic coil current and axial armature movement.

4. The valve of claim 2, wherein movement of said armature is in proportion to flow of current through said magnet coil.

5. The valve of claim 1, wherein said leaf spring elements bent angularly.

6. The valve of claim 5, wherein said angular bend is between 5 to 30 degrees.

7. The valve of claim 1 wherein said contact point of said leaf spring elements moves orbitally relative to said armature with movement of said armature.

8. The valve of claim 1 wherein said armature comprises an elastomer material for forming a seal with said valve seat.

9. A valve comprising:
   a valve body forming a valve cavity tar providing fluid communication therethrough, said valve cavity forming a seat;

an armature-valve element supporting within said cavity and reciprocatingly engaged with said seat;

a leaf spring, said leaf spring supporting said armature within said cavity and providing a biasing force against said armature; wherein said leaf spring comprises centering leaf springs in combination with a plurality of orbitally disposed spring elements radiating arcuately from a valve centering support and adapted such that a contact point of said leaf spring to said armature remains substantially at the same distance from the armature's centerpoint during in and out movement of said armature such that said orbitally disposed leaf spring elements are axially deflected against said valve body; and a magnetic coil for providing an armature valve element driving force wherein said leaf spring elements radiate arcuately from a valve centering support and are adapted such that a contact point of said leaf spring to said armature remains substantially at the same distance from the armature's centerpoint during in and out movement of said armature spring.

10. The valve of claim 9, wherein said armature valve element is further centered within said scat by said orbital leaf spring.

11. The valve of claim 9, wherein said orbitally radiating leaf springs elements are bent to an angle for providing additional axially deflected force during armature movement.

12. The valve of claim 10, wherein said armature valve element further comprises a magnetically responsive disk concentrically attached to said armature.

13. The valve of claim 11, wherein said orbital leaf springs are at an leaf spring angle between 5 to 30 degrees with respect to the armature plane.

14. The valve of claim 9, wherein the in magnitude of the magnetic force exerted on the armature, in comparison to the opposing spring force exerted by the orbital leaf springs, is sufficient to overcome the spring bias in a fashion proportional to a magnetic coil current.

15. The valve of claim 9, wherein said orbital leaf spring are constructed in such a non-uniform beam manner as to create a linear relationship between magnet coil current and axial armature movement.

16. The valve of claim 15, wherein the strength of the beam of said leaf spring is proportional to the cube root of the thickness of said beam.

17. The valve of claim 15, wherein the material thickness of said orbital leaf springs are increased to within manufacturing tolerances by an electroless nickel plating process.

18. The valve of claim 17, wherein said plating process allows for extreme accurate plating thickness in the order of increments of 0.001" to be applied.

\* \* \* \* \*